US006547710B1

(12) United States Patent
Patel et al.

(10) Patent No.: US 6,547,710 B1
(45) Date of Patent: Apr. 15, 2003

(54) SULFONATED RUBBER COMPOSITIONS AND PROCESSES THEREFOR AND THEREWITH

(75) Inventors: Bharat B. Patel, Bartlesville, OK (US); Marshall D. Bishop, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 183 days.

(21) Appl. No.: 09/712,117

(22) Filed: Nov. 14, 2000

(51) Int. Cl.$^7$ .................................................. C08F 8/38
(52) U.S. Cl. ................. 515/344; 525/332.8; 525/332.9; 525/333.1; 525/333.2; 525/353
(58) Field of Search .................................. 525/344, 353

(56) References Cited

U.S. PATENT DOCUMENTS

| 4,077,923 A | | 3/1978 | Tanaka et al. ................ 260/2.3 |
| 4,428,844 A | | 1/1984 | Wagener ................ 252/8.5 LC |
| 4,836,940 A | | 6/1989 | Alexander ................ 252/8.512 |
| 5,348,994 A | * | 9/1994 | Gorbaty et al. ................ 524/68 |

FOREIGN PATENT DOCUMENTS

JP        356127604     * 10/1981

* cited by examiner

Primary Examiner—Bernard Lipman
(74) Attorney, Agent, or Firm—Gary L. Haag

(57) ABSTRACT

A sulfonated, oxidized rubber composition and a neutralized, sulfonated, oxidized rubber composition are provided. The sulfonated, oxidized rubber composition, preferably a composition containing such sulfonated, oxidized rubber composition, can be used as an additive in or for asphalt. The neutralized, sulfonated, oxidized rubber composition, preferably a composition comprising such neutralized, sulfonated, oxidized rubber composition, can be used for oil field applications such as preventing the loss of fluids used during such oil field applications. A process of preparing such compositions includes contacting a rubber composition, such as butyl rubber in the form of waste tire particles, with an oxidizing agent to provide an oxidized rubber composition. The oxidized rubber composition is then contacted with a sulfur-containing acid to provide a sulfonated, oxidized rubber composition. The sulfonated, oxidized rubber composition is then contacted with a base to provide a neutralized, sulfonated, oxidized rubber composition.

75 Claims, No Drawings

SULFONATED RUBBER COMPOSITIONS AND PROCESSES THEREFOR AND THEREWITH

BACKGROUND OF THE INVENTION

The present invention relates to a sulfonated rubber composition, a process of preparing such composition, and a process of using such composition.

During oil field applications such as drilling and completion operations, large flow channels such as, for example, fractures, joints, and voids around the wellbore, whether induced or natural, can cause various problems during such drilling and completion operations. Such problems can include a substantial loss of fluids from the wellbore which can result in the loss of hydrostatic head with the subsequent potential for losing control of the well. Such problems can also lead to damage of the production capacity of oil and gas zones when the flow channels represent a portion of the drainage pattern.

Various methods have been used in an attempt to control the loss of fluids from the flow channels. For example, one common method is to increase the viscosity of the fluids, such as drilling muds, or to increase the resistance of the flow of such fluids into the formation. Another technique involves the addition of a bulk material, such as cork, saw dust, paper, mica flakes, cloth fibers, and the like and combinations thereof, to such fluids being used. However, these methods are not always effective because the solids may be lost in the flow channels. Further, addition of such bulk materials does not assure the plugging of such channels.

Another example method utilized to reduce or eliminate lost circulation during oil field applications such as drilling and completion operations is to use a cement, such as Plaster of Paris or a silicate, either alone or in combination with the previously discussed bulk materials. However, problems are often encountered using the cement such as the cement separating out of the cement slurry that is introduced into the wellbore, heavier cement particles in the slurry having a tendency to separate from the water and become dehydrated before the porous subterranean formation is sealed, and the cement slurry passing into the porous formation without effectively plugging the openings in the wellbore sidewall.

Another such process which has been utilized to prevent the loss of fluids during oil field applications is to employ a gel. Such use of a gel can result in the crosslinking of such gel either at the surface, during placement, or in-situ. However, hydraulic forces may lead to dehydration, channeling, or even extrusion of such gel. Further, it is difficult to control the gelation characteristics of water-soluble polymers and therefore difficult to assure reduction of lost circulation of fluids during oil field applications.

Similarly, fractures can also occur in an injection well, a producing well, or both. In order to correct sweep profile encountered in fractured reservoirs, large volumes of gelable polymer solutions can be used to plug the fractures. However, the effectiveness of these treatments are adversely affected by hydraulic failure of the gel near the wellbore.

In addition, during the drilling of wells, drilling fluid is generally circulated down the drill string and back up the annulus between the drill string and the wellbore face. A casing string or liner is then cemented into the wellbore. However, numerous annular leaks through the cement can occur. Such oil or gas leaks through the cement contaminate the ground water causing environmental problems. Further, gas leaks through the cement out to the well surface can also present a hazardous condition.

Thus, there is a continuing need to develop an effective and efficient method of reducing or eliminating lost circulation of fluids used during oil field applications. Further, development of an effective and efficient composition and process for using such composition for oil field applications, such as reducing or eliminating lost circulation of fluids used during such oil field applications, would be a significant contribution to the art and to the economy.

In addition, with the rapid increase of the number of automobiles, a severe problem has occurred in connection with the disposal of rubber compositions such as waste tires. Thus, development of a method to dispose of rubber compositions such as waste tires would also be a significant contribution to the art and to the economy. Further, development of a method to dispose of rubber compositions such as waste tires which results in a composition which can be used for oil field applications, such as for reducing or eliminating lost circulation of fluids used during such oil field applications, would also be a significant contribution to the art and to the economy. Still further, development of a method to dispose of rubber compositions such as waste tires which results in a composition which can be used for contacting with asphalt, i.e., used as an additive in or for asphalt, would also be a significant contribution to the art and to the economy.

SUMMARY OF THE INVENTION

An object of the present invention is to provide a sulfonated, oxidized rubber composition.

Another object of the present invention is to provide a neutralized, sulfonated, oxidized rubber composition.

Still another object of the present invention is to provide a composition comprising a sulfonated, oxidized rubber composition which is useful for contacting with asphalt, i.e., useful as an additive in or for asphalt.

Yet another object of the present invention is to provide a composition comprising a neutralized, sulfonated, oxidized rubber composition which is useful for a variety of processes including, but not limited to, use for oil field applications such as preventing the loss of fluids used during such oil field applications.

Still another object of the present invention is to provide a method(s) of making a sulfonated, oxidized rubber composition, a composition comprising such sulfonated, oxidized rubber composition, a neutralized, sulfonated, oxidized rubber composition, and a composition comprising such neutralized, sulfonated, oxidized rubber composition.

Still yet another object of the present invention is to provide a process of using rubber compositions, such as waste tires, to provide a sulfonated, oxidized rubber composition, a composition comprising such sulfonated, oxidized rubber composition, a neutralized, sulfonated, oxidized rubber composition, and/or a composition comprising such neutralized, sulfonated, oxidized rubber composition.

A further object of the present invention is to provide a process of disposing of rubber compositions, such as waste tires, in a process that is economically cheaper and easier than prior art methods.

A still further object of the present invention is to provide a process for preventing the loss of fluids used during oil field applications such as preventing seepage losses of such fluids and reducing fluid loss in water-based fluids and emulsions used during such oil field applications.

According to an embodiment of the present invention, a sulfonated, oxidized rubber composition is provided which can be used as an additive in or for asphalt. Such sulfonated, oxidized rubber composition is prepared by a process which comprises contacting a quantity of a rubber composition, which is of a particle size generally in the range of about 150 micrometers to about 2000 micrometers, with an oxidizing agent to provide an oxidized rubber composition. Such oxidized rubber composition is then contacted with a sulfur-containing acid to provide a sulfonated, oxidized rubber composition which is then subjected to cooling and, optionally, subjected to drying. Preferably, such sulfonated, oxidized rubber composition is contained in a suspension comprising such sulfonated, oxidized rubber composition and sulfur-containing acid to provide a composition comprising such sulfonated, oxidized rubber composition which can be contacted with asphalt, i.e., used as an additive in or for asphalt.

According to another embodiment of the present invention, a neutralized, sulfonated, oxidized rubber composition is provided which can be used for oil field applications, such as preventing the loss of fluids used during such oil field applications. Such neutralized, sulfonated, oxidized rubber composition is prepared by a process which comprises contacting a quantity of a rubber composition, which is of a particle size generally in the range of about 150 micrometers to about 2000 micrometers, with an oxidizing agent to provide an oxidized rubber composition. Such oxidized rubber composition is then contacted with a sulfur-containing acid to provide a sulfonated, oxidized rubber composition which is then subjected to cooling and contacting with a base to provide a neutralized, sulfonated, oxidized rubber composition which is then subjected to drying and, optionally, size reduction. Such neutralized, sulfonated, oxidized rubber composition may be contacted with other materials including, but not limited to, an aqueous medium, and one or more other components such as clays, polymers, other loss circulation additives, and the like and combinations thereof, to provide a composition comprising a neutralized, sulfonated, oxidized rubber composition which can be used for oil field applications such as preventing the loss of fluids used during such oil field applications.

According to another embodiment of the present invention, a process which can be used for oil field applications, such as preventing the loss of fluids used during such oil field applications, is provided. The process comprises contacting a neutralized, sulfonated, oxidized rubber composition, preferably a composition comprising such neutralized, sulfonated, oxidized rubber composition, with a subterranean formation wherein such neutralized, sulfonated, oxidized rubber composition, preferably a composition comprising such neutralized, sulfonated, oxidized rubber composition, can be the same as that disclosed herein.

DETAILED DESCRIPTION OF THE INVENTION

The term "hydrocarbon" refers to any hydrocarbon(s) which may or may not be oxygenated or substituted with appropriate substituents.

The term "oil field application" refers to, but is not limited to, any drilling, completion of drilling, production of hydrocarbons, permeability alteration, water coding correction, water shutoff, gas shutoff, zone abandonment, and the like and combinations thereof.

The term "fluid" refers to any fluid used for or during oil field applications. Examples of suitable fluids include, but are not limited to, drilling fluids, completion fluids, workover fluids, and the like and combinations thereof.

The term "rubber" refers to one or more of a group of synthetic elastomers and thermoplastic rubbers having properties similar to natural rubber. Examples of rubber include, but are not limited to, butyl rubber (such as the copolymer of isobutylene and isoprene), polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and the like and combinations thereof. A preferred rubber is butyl rubber which is commonly found in waste tires.

The term "oxidizing agent" refers to any compound that spontaneously evolves oxygen either at room temperature or under slight heating. Examples of suitable oxidizing agents include, but are not limited to, peroxides, chlorates, perchlorates, nitrates, permanganates, oxygen under pressure, and the like and combinations thereof. A preferred oxidizing agent is hydrogen peroxide.

The term "oxidized" refers to any mixture or composition disclosed herein which has been contacted with an oxidizing agent as disclosed herein according to a process of the present invention.

The term "sulfonated" refers to any mixture or composition disclosed herein which has been contacted with a sulfur-containing acid as disclosed herein according to a process of the present invention.

The term "neutralized" refers to any mixture or composition disclosed herein which has been contacted with a base as disclosed herein according to a process of the present invention.

The term "asphalt" refers to any asphalt composition, preferably semi-solid, known in the art including, but not limited to, petroleum asphalt, Trinidad pitch, mineral pitch, cut-back asphalt, and the like and combinations thereof which is obtained primarily from the residue or bottoms of the petroleum refining industry having bitumens as primary constituents and can be used primarily for road paving, road coating, and roofing.

According to an embodiment of the present invention, a sulfonated, oxidized rubber composition which can be used for contacting with asphalt, i.e., used as an additive in or for asphalt, is provided. Such sulfonated, oxidized rubber composition can be neutralized to provide a neutralized, sulfonated, oxidized rubber composition which can be used for oil field applications. The neutralized, sulfonated, oxidized rubber composition of the present invention can also be referred to as a salt of a sulfonated, oxidized rubber composition. A process of producing a sulfonated, oxidized rubber composition of the present invention comprises contacting, preferably by mixing or stirring, a rubber composition with an oxidizing agent, preferably hydrogen peroxide, under an oxidizing agent-contacting condition to provide an oxidized rubber composition. Such rubber composition has a particle size generally in the range of from about 150 micrometers to about 2000 micrometers, preferably in the range of from about 150 micrometers to about 850 micrometers, more preferably in the range of from about 250 micrometers to about 850 micrometers, and most preferably in the range of from 300 micrometers to 600 micrometers.

Such rubber composition is preferably a butyl rubber in the form of waste tires which have been subjected to particle size reduction by any manner or method(s) known in the art to obtain a particle size disclosed herein and then subjected to any cryogenic process known in the art to freeze such tires making them brittle and easily pulverized. Many of the means for reducing the size of the rubber composition, preferably butyl rubber in the form of waste tires, such as granulating means or grinding means or crushing means, suitable for use in a process of the present invention are described in detail in *Perry's Chemical Engineers' Handbook*, Sixth Edition, at pages 8-20 through 8-48, which pages are incorporated herein by reference. Thus, suitable means for reducing, such as grinding means, granulating means, or crushing means can include, but are not limited to, devices such as crushers, mills, shredders, cutters, and the like.

The amount of oxidizing agent required is an amount which, when used according to a process of the present invention, provides for an oxidized rubber composition. The amount of oxidizing agent required is an amount which provides for a weight ratio of rubber composition to oxidizing agent generally in the range of from about 1:2 to about 30:1, preferably in the range of from about 1:1 to about 15:1, and more preferably in the range of from 2:1 to 10:1.

The oxidizing agent-contacting condition comprises a temperature sufficient to maintain a reaction between the rubber composition and the oxidizing agent. Generally, the temperature is in the range of from about 70° F. to about 120° F., preferably in the range of from about 70° F. to about 115° F., and more preferably in the range of from 70° F. to 110° F. The oxidizing agent-contacting condition also comprises a pressure in the range of from about atmospheric (i.e., about 14.7 pounds per square inch absolute) to about 100 pounds per square inch absolute (psia), preferably about atmospheric, and a time period sufficient to allow the temperature to be maintained. Generally such time period is in the range of from about 1 minute to about 60 minutes, preferably in the range of from about 1 minute to about 30 minutes, and more preferably in the range of from 5 minutes to 20 minutes. If the temperature ranges for the oxidizing agent-contacting condition cannot be obtained from and/or maintained with the exothermic nature of the reaction of the oxidizing agent with the rubber composition, then additional heat can be applied to such mixture by any manner or method(s) known in the art such as a hot plate, bunsen burner, and the like and combinations thereof.

The resulting oxidized rubber composition is then subjected to contacting, preferably by mixing or stirring, with a sulfur-containing acid under an acid-contacting condition to provide a sulfonated, oxidized rubber composition, preferably a sulfonated, oxidized butyl rubber. Examples of suitable sulfur-containing acids include, but are not limited to, sulfuric acid, fuming sulfuric acid, chlorosulfonic acid, p-toluene sulfonic acid, methane sulfonic acid, and the like and combinations thereof. The presently preferred sulfur-containing acid is sulfuric acid. In addition, a first aqueous medium, such as deionized water, can be added to the mixture comprising a rubber composition and oxidizing agent before contact with a sulfur-containing acid. The amount of such aqueous medium, if added, can generally be in the range of from about 10 percent to about 90 percent of the total volume of the mixture comprising a rubber composition and an oxidizing agent, preferably in the range of from about 15 percent to about 85 percent of the total volume of the mixture comprising a rubber composition and an oxidizing agent, and more preferably in the range of from 20 percent to 80 percent of the total volume of the mixture comprising a rubber composition and an oxidizing agent.

Generally, the concentration of sulfur-containing acid, preferably sulfuric acid, can be in the range of from about 0.01 molar (molar refers to a concentration in which 1 molecular weight in grams (1 mole) of a substance is dissolved in enough solvent to make 1 liter of solution) to about 15 molar, preferably in the range of from about 0.02 molar to about 10 molar, more preferably in the range of from about 0.05 molar to about 8 molar, and most preferably in the range of from 0.1 molar to 6 molar.

The amount of sulfur-containing acid required is an amount which, when used according to a process of the present invention, provides for a sulfonated, oxidized rubber composition. The amount of sulfur-containing acid required is an amount that provides for a mixture, comprising an oxidized rubber composition, a sulfur-containing acid, and optionally a first aqueous medium, having a pH generally in the range of from about 2 to about 6, preferably in the range of from about 2.5 to about 5.5, and more preferably in the range of from 3 to 5.

The acid-contacting condition comprises a temperature based on the exothermic nature of the reaction of the sulfur-containing acid with the mixture comprising an oxidized rubber composition and optionally a first aqueous medium. Generally such temperature is in the range of from about 110° F. to about 300° F., preferably in the range of from about 110° F. to about 290° F., and more preferably in the range of from 120° F. to 280° F. Such acid-contacting condition also comprises a pressure in the range of from about atmospheric (i.e., about 14.7 pounds per square inch absolute) to about 100 pounds per square inch absolute (psia), preferably about atmospheric, and a time period sufficient to allow the temperature to be maintained. Generally such time period is in the range of from about 1 minute to about 60 minutes, preferably in the range of from about 1 minute to about 30 minutes, and more preferably in the range of from 5 minutes to 20 minutes. If the temperature ranges for the acid-contacting condition cannot be obtained from and/or maintained with the exothermic nature of the reaction of the sulfur-containing acid with the mixture comprising an oxidized rubber composition and optionally a first aqueous medium, then additional heat can be applied to such mixture by any manner or method(s) known in the art such as a hot plate, bunsen burner, and the like and combinations thereof.

The resulting mixture, also referred to as a suspension, can then be subjected to cooling under a cooling condition sufficient to provide a cooled mixture having a temperature in the range of from about 60° F. to about 150° F., preferably in the range of from about 60° F. to about 140° F., and more preferably in the range of from 70° F. to 130° F. Such cooling condition comprises a pressure in the range of from about atmospheric (i.e., about 14.7 pounds per square inch absolute) to about 100 psia, preferably about atmospheric, and a time period necessary to maintain such temperature. Generally, such time period is in the range of from about 1 minute to about 60 minutes, preferably in the range of from about 1 minute to about 30 minutes, and more preferably in the range of from 1 minute to 20 minutes. Such cooling can be accomplished by any manner or method(s) known in the art.

Optionally, the resulting cooled mixture can be dried under a drying condition sufficient to provide a dried, sulfonated, oxidized rubber composition, preferably a dried, sulfonated, oxidized butyl rubber. Generally, such drying condition comprises a temperature in the range of from about 180° F. to about 280° F., preferably in the range of from about 200° F. to about 260° F., and more preferably in the range of from 200° F. to 250° F. Such drying condition can also comprise a time period sufficient for drying such mixture generally in the range of from about 0.1 hour to about 40 hours, preferably in the range of from about 0.1 hour to about 20 hours, and more preferably in the range of from 0.1 hour to 10 hours to provide a dried, sulfonated, oxidized rubber composition. Such drying condition can also include a pressure generally in the range of from about atmospheric (i.e., about 14.7 pounds per square inch absolute) to about 150 psia, preferably in the range of from about atmospheric to about 100 psia, more preferably about atmospheric, so long as the desired temperature can be maintained. Any drying method(s) known to one skilled in the art such as, for example, air drying, heat drying, and the like and combinations thereof can be used.

Preferably, a sulfonated, oxidized rubber composition of the present invention is present as a component of a liquid suspension comprising such sulfonated, oxidized rubber composition, a sulfur-containing acid, and, optionally, a first aqueous medium. The formation of such suspension allows such suspension to be used for contacting with asphalt, i.e., used as an additive in or for asphalt. When a sulfonated, oxidized rubber composition of the present invention is present as a component of such liquid suspension, the weight ratio of liquid comprising a sulfur-containing acid and, optionally, a first aqueous medium to a sulfonated, oxidized rubber composition of the present invention is a weight ratio which allows such liquid suspension to be contacted with asphalt, i.e., to be used as an additive in or for asphalt. Generally, such weight ratio is in the range of from about 1:1 to about 50:1, preferably in the range of from about 5:1 to about 40:1, and more preferably in the range of from 110:1 to 20:1. The liquid suspension comprising such sulfonated, oxidized rubber composition, a sulfur-containing acid, and, optionally, a first aqueous medium has a pH generally in the range of from about 2 to about 6.5, preferably in the range of from about 2.5 to about 6, and more preferably in the range of from 3 to 6.

To produce a neutralized, sulfonated, oxidized rubber composition of the present invention, the resulting mixture comprising a sulfonated, oxidized rubber composition, preferably a cooled mixture, can then be subjected to contacting with a base under a base-contacting condition sufficient to provide a neutralized, sulfonated, oxidized rubber composition, preferably a neutralized, sulfonated, oxidized butyl rubber, which can also be referred to as a salt of a sulfonated, oxidized rubber composition, preferably a salt of a sulfonated, oxidized butyl rubber. In addition, a second aqueous medium, such as deionized water, can be added to the mixture comprising a sulfonated, oxidized rubber composition before such contacting with a base. The amount of such second aqueous medium if added can generally be in the range of from about 10 percent to about 90 percent of the total volume of mixture, preferably in the range of from about 15 percent to about 85 percent of the total volume of mixture, and more preferably in the range of from 20 percent to 80 percent of the total volume of mixture.

Examples of a suitable base include, but are not limited to, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, and the like and combinations thereof. The preferred base is sodium hydroxide.

Generally, the concentration of base, preferably sodium hydroxide, can be in the range of from about 0.01 molar (molar refers to a concentration in which 1 molecular weight in grams (1 mole) of a substance is dissolved in enough solvent to make 1 liter of solution) to about 15 molar, preferably in the range of from about 0.02 molar to about 10 molar, more preferably in the range of from about 0.05 molar to about 8 molar, and most preferably in the range of from 0.1 molar to 6 molar.

The amount of base required is an amount which, when used according to a process of the present invention, provides for a neutralized, sulfonated, oxidized rubber composition. The amount of base required is an amount that provides for a mixture, comprising a sulfonated, oxidized rubber composition, a base, and optionally a second aqueous medium, having a pH generally in the range of from about 6 to about 11.5, preferably in the range of from about 7 to about 11, and more preferably in the range of from 7.5 to 10.

The base-contacting condition comprises a temperature that provides a neutralized, sulfonated, oxidized rubber composition, preferably a neutralized, sulfonated, oxidized butyl rubber. Generally, such temperature is in the range of from about 100° F. to about 200° F., preferably in the range of from about 100° F. to about 190° F., and more preferably in the range of from 110° F. to 180° F. Such base-contacting condition also comprises a pressure in the range of from about atmospheric (i.e., about 14.7 pounds per square inch absolute) to about 100 psia, preferably about atmospheric, and a time period sufficient to provide a neutralized, sulfonated, oxidized rubber composition generally in the range of from about 1 minute to about 60 minutes, preferably in the range of from about 1 minute to about 30 minutes, and more preferably in the range of from 5 minutes to 20 minutes. After contacting with a base, the resulting mixture can be subjected to cooling under a cooling condition as described herein to provide a cooled mixture. Such cooling allows for easier handling of the mixture.

Optionally, the mixture, preferably cooled mixture, can then subjected to drying under a drying condition sufficient to provide a dried, neutralized, sulfonated, oxidized rubber composition, preferably a dried, neutralized, sulfonated, oxidized butyl rubber. Generally, such drying condition comprises a temperature in the range of from about 180° F. to about 280° F., preferably in the range of from about 200° F. to about 260° F., and more preferably in the range of from 200° F. to 250° F. Such drying condition can also comprise a time period sufficient for drying such mixture generally in the range of from about 0.1 hour to about 40 hours, preferably in the range of from about 0.1 hour to about 20 hours, and more preferably in the range of from 0.1 hour to 10 hours to provide a dried, neutralized, sulfonated, oxidized rubber composition. Such drying condition can also include a pressure generally in the range of from about atmospheric (i.e., about 14.7 pounds per square inch absolute) to about 150 psia, preferably in the range of from about atmospheric to about 100 psia, more preferably about atmospheric, so long as the desired temperature can be maintained. Any drying method(s) known to one skilled in the art such as, for example, air drying, heat drying, and the like and combinations thereof can be used.

Generally, a sulfonated, oxidized rubber composition of the present invention has a particle size which enables such sulfonated, oxidized rubber composition to be used according to a process of the present invention as an additive in or for asphalt. Generally, a sulfonated, oxidized rubber composition of the present invention has a particle size in the range of from about 150 micrometers to about 2000 micrometers, preferably in the range of from about 150 micrometers to about 850 micrometers, more preferably in the range of from about 250 micrometers to about 850 micrometers, and most preferably in the range of from 300 micrometers to 600 micrometers.

Generally, a neutralized, sulfonated, oxidized rubber composition of the present invention has a particle size which enables such neutralized, sulfonated, oxidized rubber composition to be used according to a process of the present invention for oil field applications such as preventing the loss of fluids used during such oil field applications. Generally, a neutralized, sulfonated, oxidized rubber composition of the present invention, preferably a dried, neutralized, sulfonated, oxidized rubber composition of the present invention, has a particle size in the range of from about 150 micrometers to about 2000 micrometers, preferably in the range of from about 150 micrometers to about 850 micrometers, more preferably in the range of from about 250 micrometers to about 850 micrometers, and most preferably in the range of from 300 micrometers to 600 micrometers.

If necessary, a sulfonated oxidized rubber composition of the present invention can be subjected to particle size reduction by any manner or method(s) known in the art to obtain a sulfonated, oxidized rubber composition of the present invention having a particle size as disclosed herein. Such size reduction can include, but is not limited to, grinding, crushing, granulating and the like and combinations thereof, of the sulfonated, oxidized rubber composition to provide a material having the critical physical properties, such as particle size, necessary for use as an additive in or for asphalt.

A neutralized, sulfonated, oxidized rubber composition of the present invention, preferably a dried, neutralized, sulfonated, oxidized rubber composition of the present invention, can be subjected to particle size reduction by any manner or method(s) known in the art to obtain a neutralized, sulfonated, oxidized rubber composition of the present invention having a particle size as disclosed herein. Such size reduction can include, but is not limited to, grinding, crushing, granulating and the like and combinations thereof, of the neutralized, sulfonated, oxidized rubber composition to provide a material having the critical physical properties, such as particle size, necessary for use for oil field applications such as preventing the loss of fluids used during such oil field applications.

Any suitable means for reducing the size of a sulfonated, oxidized rubber composition of the present invention and/or a neutralized, sulfonated, oxidized rubber composition of the present invention can be used to obtain a particle size as disclosed herein. Many of the means for reducing the size of the sulfonated, oxidized rubber composition and/or neutralized, sulfonated, oxidized rubber composition, such as granulating means or grinding means or crushing means, suitable for use in a process of the present invention are described in detail in *Perry's Chemical Engineers' Handbook*, Sixth Edition, at pages 8-20 through 8-48, which pages are incorporated herein by reference. Thus, suitable means for reducing, such as grinding means, granulating means, or crushing means can include, but are not limited to, devices such as crushers, mills, shredders, cutters, and the like. The preferred means for reducing the particle size of a neutralized, sulfonated, oxidized rubber composition of the present invention includes mills.

Generally, a sulfonated, oxidized rubber composition of the present invention can have any suitable particle shape that allows such sulfonated, oxidized rubber composition to be used as an additive in or for asphalt. Examples of a suitable particle shape of a sulfonated, oxidized rubber composition of the present invention include, but are not limited to, irregularly-shaped particles, pellets, and the like and combinations thereof.

Generally, a neutralized, sulfonated, oxidized rubber composition of the present invention can have any suitable particle shape that allows such neutralized, sulfonated, oxidized rubber composition to be used for oil field applications such as preventing the loss of fluids used during such oil field applications. Examples of a suitable particle shape of a neutralized, sulfonated, oxidized rubber composition of the present invention include, but are not limited to, irregularly-shaped particles, pellets, and the like and combinations thereof.

According to another embodiment of the present invention, a neutralized, sulfonated, oxidized rubber composition of the present invention, preferably a composition comprising such neutralized, sulfonated, oxidized rubber composition of the present invention, is contacted with a subterranean formation, preferably by injection into such subterranean formation. A neutralized, sulfonated, oxidized rubber composition of the present invention can be combined or mixed, by any suitable manner or method(s) known in the art, with an aqueous medium, a suspension comprising undissolved solids, gas, or oil, and the like and combinations thereof, before it is contacted with, preferably injected into, a subterranean formation.

Preferably, a neutralized, sulfonated, oxidized rubber composition of the present invention can be combined or mixed, by any manner or method(s) known in the art, with any suitable aqueous medium, such as water, to provide an aqueous solution comprising such neutralized, sulfonated, oxidized rubber composition suitable for contacting with, preferably injecting into, a subterranean formation wherein such aqueous solution comprising such neutralized, sulfonated, oxidized rubber composition is capable of flowing or traveling to a desired location in such subterranean formation. When an aqueous medium is present, the weight ratio of aqueous medium to a neutralized, sulfonated, oxidized rubber composition of the present invention is generally in the range of from about 1:1 to about 50:1, preferably in the range of from about 5:1 to about 40:1, and more preferably in the range of from 10:1 to 20:1.

In addition to an aqueous medium, a neutralized, sulfonated, oxidized rubber composition of the present invention can be combined or mixed, by any manner or method(s) known in the art, with one or more other components such as clays, polymers, other loss circulation additives, and the like and combinations thereof. Examples of suitable clays include, but are not limited to, montmorillonite, kaolinite, halloysite, vermiculite, attapulgite, smectite, illite, saconite, sepiolite, polygorskite, fuller's earth, chlorite, and the like and combinations thereof. Examples of suitable polymers include, but are not limited to, starches, gums, biopolysaccharides, cellulose, ethers, synthetics, and the like and combinations thereof. A preferred polymer is a carboxylate-containing polymer which can be crosslinked with a multivalent metallic compound. Examples of suitable other loss circulation additives include, but are not limited to, paper, cork, saw dust, wood shavings, rock, mica flakes, cloth, cements (such as Plaster of Paris), silicates, and the like and combinations thereof. The amount of such additional component(s) to be added to a neutralized, sulfonated, oxidized rubber composition of the present invention, and preferably an aqueous medium, can be any amount which provides for a composition comprising a neutralized, sulfonated, oxidized rubber composition of the present invention which can be contacted with, preferably injected into, a subterranean formation and preferably helps prevent the loss of fluids into such subterranean formation during oil field applications. A preferred composition comprises a neutralized, sulfonated, oxidized rubber composition of the present invention, an aqueous medium, and a clay.

When an additional component(s) is present, the weight ratio of additional component(s), such as clays, polymers, other loss circulation additives, and the like and combinations thereof, to a neutralized, sulfonated, oxidized rubber composition of the present invention, and preferably an aqueous medium, is generally in the range of from about 1:1 to about 50:1, preferably in the range of from about 5:1 to about 40:1, and more preferably in the range of from 10:1 to 20:1.

The amount of a neutralized, sulfonated, oxidized rubber composition of the present invention, preferably a composition comprising such neutralized, sulfonated, oxidized rubber composition of the present invention, contacted with, preferably injected into, a subterranenan formation according to a process of the present invention, can vary widely depending on the treatment required or desired. Generally, a process of contacting, preferably injecting, a neutralized, sulfonated, oxidized rubber composition of the present invention, preferably a composition comprising such neutralized, sulfonated, oxidized rubber composition of the present invention, with or into a subterranean formation is carried out when, for example, there is an indication of fluid loss during oil field applications; or when there is an increase in fluid or gas pressure in the drill stem for treating an unstable matrix in a subterranean formation; or there is an increase in unconsolidated sediments as shown by a higher rate of unconsolidated sediment reduction; and/or the like and combinations thereof.

The nature of the subterranean formation is not critical to the practice of a process of the present invention. A neutralized, sulfonated, oxidized rubber composition of the present invention, preferably a composition comprising such neutralized, sulfonated, oxidized rubber composition of the present invention, can be contacted with, preferably injected into, a subterranean formation having a temperature generally in the range of from about 35° F. to about 600° F., preferably in the range of from about 50° F. to about 550° F., and more preferably in the range of from 60° F. to 500° F. Any manner or method(s) known to one skilled in the art such as, for example, pumps, can be used for contacting, preferably injecting, a neutralized, sulfonated, oxidized rubber composition of the present invention, preferably a composition comprising such neutralized, sulfonated, oxidized rubber composition of the present invention, with or into a subterranean formation.

Before contact with, preferably before injection into, a subterranean formation, the temperature of a neutralized, sulfonated, oxidized rubber composition of the present invention, preferably a composition comprising such neutralized, sulfonated, oxidized rubber composition of the present invention, is generally in the range of from about 30° F. to about 150° F., preferably in the range of from about 40° F. to about 120° F., and more preferably in the range of from 50° F. to 100° F.

The following examples are presented to further illustrate this invention and are not to be construed as unduly limiting the scope of this invention.

EXAMPLE I

This example illustrates the preparation of various compositions which can be used for oil field applications.

Composition A (Control)

Throughout the following procedure, mixing was continuous and was conducted with a thermometer. A 10 gram quantity of cryogenically frozen waste tires sized in a range of about 425 micrometers to about 600 micrometers obtained from Southwest Rubber, Inc., Bristow, Okla., was mixed with 10 mL of concentrated sulfuric acid ($H_2SO_4$, 98 percent) added dropwise. The temperature increased to greater than about 170° F. indicating some reaction occurred by the addition of sulfuric acid. The temperature then decreased to about 100° F. Next, 10 mL of deionized water were mixed with the mixture of tires and sulfuric acid. Such mixture was then subjected to contacting with a base by adding 50 percent weight/volume (w/v) sodium hydroxide (NaOH) solution dropwise until a pH of about 9 was obtained. During the contacting with a base, the temperature increased to about 150° F. After cooling to about 80° F., the resulting mixture was then dried in an oven at 220° F. The resulting dried material was then subjected to particle size reduction by hand grinding such dried material to a size of less than about 1180 micrometers. A 1 gram quantity of the resulting size-reduced material was then added to 100 mL of deionized water. After mixing with a spatula, the pH was about 11.4. It was observed that the solids settled at the bottom whereas the water phase was practically clear indicating minimal solubility of the resulting material.

Composition B (Invention)

Throughout the following procedure, mixing was continuous and was conducted with a thermometer. A 10 gram quantity of cryogenically frozen waste tires sized in a range of about 425 micrometers to about 600 micrometers obtained from Southwest Rubber, Inc., Bristow, Okla., was mixed with 6 mL of 30 percent hydrogen peroxide ($H_2O_2$) added dropwise. After about 5 minutes, the temperature of the resulting mixture was increased to about 100° F. A 10 mL quantity of concentrated sulfuric acid ($H_2SO_4$, 98 percent) was then added dropwise to such mixture. The temperature increased to about 230° F. indicating some reaction occurred by the addition of sulfuric acid. After cooling to about 120° F., 10 mL of deionized water were mixed with the mixture of tires and sulfuric acid. Such mixture was then subjected to contacting with a base by adding 50 percent weight/volume (w/v) sodium hydroxide (NaOH) solution dropwise until a pH of about 9 was obtained. During the contacting with a base, the temperature increased to about 175° F. After cooling to about 80° F., the resulting mixture was then dried in an oven at 220° F. The resulting dried material was then subjected to particle size reduction by hand grinding such dried material to a size of less than about 1180 micrometers. A 1 gram quantity of the resulting size-reduced material was then added to 100 mL of deionized water. After mixing with a spatula, the pH was about 10.9. It was observed that there was no separate clear water phase after cooling to room temperature. The liquid phase appeared to be brown to black in color with particles at the bottom.

Composition C (Invention)

Throughout the following procedure, mixing was continuous and was conducted with a thermometer. A 10 gram quantity of cryogenically frozen waste tires sized in a range of about 425 micrometers to about 600 micrometers obtained from Southwest Rubber, Inc., Bristow, Okla., was mixed with 6 mL of 30 percent hydrogen peroxide ($H_2O_2$) added dropwise. After about 15 minutes, 6 mL of deionized water were mixed with the mixture of tires and hydrogen peroxide. Next, concentrated sulfuric acid ($H_2SO_4$, 98 percent) was added dropwise to such mixture. The temperature increased to over 270° F. indicating some reaction occurred by the addition of sulfuric acid. The sulfuric acid addition was stopped and the mixture was allowed to cool to about 140° F. The sulfuric acid addition was restarted and the temperature was about 140° F. to about 170° F. during the remainder of the sulfuric acid addition. A total of 15 mL of sulfuric acid ($H_2SO_4$, 98 percent) was used. The resulting mixture was then heated to about 200° F. and maintained at about 200° F. for about 15 minutes and was then allowed to cool to about 80° F. Such mixture was then subjected to contacting with a base by adding 50 percent weight/volume (w/v) sodium hydroxide (NaOH) solution dropwise until a pH of about 9 was obtained. The temperature during neutralization was in a range of about 140° F. to about 170° F. After cooling to about 80° F., the resulting mixture was then dried in an oven at 220° F. The resulting dried material was then subjected to particle size reduction by hand grinding such dried material to a size of less than about 1180 micrometers. A 1 gram quantity of the resulting size-reduced material was then added to 100 mL of deionized water. After mixing with a spatula, the pH was about 8.3. It was observed that such mixture dried at a slower rate than compositions A and B. It was also observed that there was an appearance of a white substance(es) in the resulting material.

Composition D (Invention)

Throughout the following procedure, mixing was continuous and was conducted with a thermometer. A 10 gram quantity of cryogenically frozen waste tires sized in a range of about 425 micrometers to about 600 micrometers obtained from Southwest Rubber, Inc., Bristow, Okla., was mixed with 6 mL of 30 percent hydrogen peroxide ($H_2O_2$) added dropwise. After about 15 minutes, 6 mL of deionized water were mixed with the mixture of tires and hydrogen peroxide. Next, 5 mL of concentrated sulfuric acid ($H_2SO_4$, 98 percent) were added dropwise to such mixture. The temperature during the acid addition was about 120° F. The resulting mixture was slowly heated to about 180° F. and maintained in a temperature range of about 160° F. to about 180° F. for about 15 minutes. The thus-heated mixture was then allowed to cool to about 120° F. The resulting cooled mixture was then subjected to contacting with a base by adding 50 percent weight/volume (w/v) sodium hydroxide (NaOH) solution dropwise until a pH of about 9 was obtained. The temperature during neutralization was in a range of about 120° F. to about 160° F. It was observed at the end of the neutralization that the resulting mixture was very foamy. After cooling to about 80° F., the resulting mixture was then dried in an oven at 220° F. The resulting dried material was then subjected to particle size reduction by hand grinding such dried material to a size of less than about 850 micrometers. A 1 gram quantity of the resulting size-reduced material was then added to 100 mL of deionized water. After mixing with a spatula, the pH was about 10.6. It was observed that a dark solution had formed.

EXAMPLE II

This example illustrates the superior solubility of a neutralized, sulfonated, oxidized rubber composition prepared according to a process of the present invention compared to a composition prepared by a method other than a process of the present invention.

The solubility in water of cryogenically frozen waste tires sized in a range of about 425 micrometers to about 850 micrometers obtained from Southwest Rubber, Inc., Bristow, Okla., Composition A (Control) (described herein in Example I), and Composition B (Invention) (described herein in Example I) were compared by determining the solubility of each composition in water using the test method for water-solubility of non-white solids by Soxhlet extraction. The Soxhlet extraction method is a known method in the art and generally comprises the use of a Soxhlet extractor which comprises a laboratory apparatus consisting of a glass flask, sample thimble, and condensing unit used for continuous reflux extraction.

The test method for water-solubility of non-white solids by Soxhlet extraction was conducted by placing a small piece of cotton in a cellulose extraction thimble (single thickness by Whatman) which was oven-dried, weighed, and the weight recorded (W). Then, approximately 2 grams of dried solids were placed under the cotton piece in the thimble and the total weight recorded (W1). The thimble was then placed into an extraction siphon and the siphon was hung onto the condenser that was suspended into a one-liter Erlenmeyer flask filled with approximately 300 mL of tap water. The flask was then placed on a hot plate (at approximately 250° F.) and cold water was flowed through the condenser. The extraction was continued until clear water flowed through the siphon into the flask. The thimble with insoluble solids and cotton was removed, oven-dried, weighed, and the weight recorded (W2). The water solubility, percent (WS, %) was calculated as follows:

$$WS, \% = \frac{(W1 - W2)}{(W1 - W)} \times 100$$

The solubility test results are disclosed in Table I.

TABLE I

| | Solubility in Water* | |
| --- | --- | --- |
| Composition | Water Solubility, % | Color of Liquid Phase of Solution |
| Cryogenically Frozen Waste Tires sized 425 to 850 micrometers | 1 | Clear Water |
| A (Control) | 44 | Light Yellow/Cream |
| B (Invention) | 60 | Black |

*Solubility was determined using the Soxhlet extraction method.

Test data in Table I clearly demonstrate that Invention Composition B, a neutralized, sulfonated, oxidized rubber composition, which was prepared utilizing an inventive process of the present invention resulted in a composition that was significantly superior to compositions prepared by methods other than an inventive process of the present invention in terms of solubility in water. The test data in Table I demonstrate that the cryogenically frozen waste tires sized in a range of about 425 micrometers to about 850 micrometers were insoluble. Test data in Table I also demonstrate that Control Composition A (sulfonated waste tires prepared without the use of an oxidizing agent such as hydrogen peroxide) was partly soluble in water. The color of solution (light yellow/cream) comprising Composition A indicated that the solubility may have been from the generation of sodium sulfate. However, the test data in Table I clearly demonstrate that Invention Composition B prepared according to a process of the present invention exhibited a superior water solubility.

EXAMPLE III

This example illustrates the superior performance of a neutralized, sulfonated, oxidized rubber composition prepared according to a process of the present invention to reduce the loss of a fluid used during oil field applications compared to a composition prepared by a method other than a process of the present invention.

The test procedure for determining the reduction of fluid loss in a drilling fluid was conducted in the following manner. A drilling fluid was prepared by mixing 22 grams of bentonite, 0.12 mL of 50 percent w/v sodium hydroxide (NaOH), and 1.1 grams of Drispac® Regular polymer (a polyanionic cellulose marketed by Drilling Specialties Company LLC, Bartlesville, Okla.) with 770 mL of tap water. A 3.5 gram quantity of each test material (Cryogenically Frozen Waste Tires sized in a range of about 425 micrometers to about 850 micrometers, Control Composition A, and Invention Compositions B, C, and D described herein in Example I) was then each mixed separately with a 245 mL quantity of the resulting drilling fluid in pint jars. Each resulting mixture was mixed for about 20 minutes using a Multimixer Model 9B with 9B29X impeller (Sterling Multi-Products, Inc., Prophetstown, Ill.). A 10.5 gram quantity of REV DUST (available from Milwhite, Inc., Houston, Tex.) was then mixed, to represent drill solids, with each resulting mixture followed by continued mixing for about 30 minutes. All samples were then capped, rolled for 4 hours in an oven at 150° F., cooled to about 90° F., mixed for about 5 minutes, and then tested according to the test procedures in American Petroleum Institute (API) RP 13B-2, Field Testing of Water-Based Drilling Fluids, Sections 2 and 3 (for plastic viscosity, yield point, 10-second and 10-minute gels, and filtration). The results are disclosed in Table II.

TABLE II

| Composition | $PV^1$ | $YP^2$ | $Gels^3$ | $FL^4$ | HTHPFL at 250° F. |
|---|---|---|---|---|---|
| Cryogenically Frozen Waste Tires sized 425 to 850 micrometers | 13 | 16 | 5/19 | 8.6 | 27.8 |
| A (Control) | 10 | 11 | 4/22 | 8.0 | 27.6 |
| B (Invention) | 11 | 14 | 11/36 | 7.4 | 24.0 |
| C (Invention) | 12 | 13 | 8/33 | 7.5 | 23.8 |
| D (Invention) | 15 | 19 | 14/34 | 8.1 | 25.4 |

[1]PV refers to Plastic Viscosity, cps.
[2]YP refers to Yield Point, lbs/100 sq. ft.
[3]Gels refers to 10-second and 10-minute gels, lbs/100 sq. ft.
[4]FL refers to Fluid Loss at room temperature, mL/30 minutes.
[5]HTHPFL at 250° F. refers to High-Temperature/High-Pressure Fluid Loss at 250° F. and 500 psi differential pressure, mL/30 minutes.

Test data in Table II clearly demonstrate that Invention Compositions B, C, and D provided a reduction of fluid loss in a drilling fluid.

The performance of Invention Compositions B, C, and D, as compared to cryogenically frozen waste tires and Control Composition A, is superior when comparing several key areas such as solubility in water and reduction of fluid loss in a drilling fluid.

The results shown in the above examples clearly demonstrate that the present invention is well adapted to carry out the objects and attain the ends and advantages mentioned as well as those inherent therein.

Reasonable variations, modifications, and adaptations can be made within the scope of the disclosure and the appended claims without departing from the scope of this invention.

What is claimed is:

1. A process of preparing a sulfonated, oxidized rubber composition comprising:
   contacting a rubber composition with an oxidizing agent under an oxidizing agent-contacting condition to provide an oxidized rubber composition, and
   contacting said oxidized rubber composition with a sulfur-containing acid under an acid-contacting condition to provide a sulfonated, oxidized rubber composition.

2. A process according to claim 1 further comprising contacting said sulfonated, oxidized rubber composition with a base under a base-contacting condition to provide a neutralized, sulfonated, oxidized rubber composition.

3. A process according to claim 2 further comprising drying said neutralized, sulfonated, oxidized rubber composition under a drying condition to provide a dried, neutralized, sulfonated, oxidized rubber composition and further wherein said dried, neutralized, sulfonated, oxidized rubber composition has a particle size in the range of from about 150 micrometers to about 2000 micrometers.

4. A process according to claim 2 wherein said sulfonated, oxidized rubber composition is subjected to cooling under a cooling condition before said contacting with a base.

5. A process according to claim 3 wherein said neutralized, sulfonated, oxidized rubber composition is subjected to cooling under a cooling condition before said drying.

6. A process according to claim 1 wherein said contacting a rubber composition with an oxidizing agent further comprises contacting with a first aqueous medium.

7. A process according to claim 1 wherein said contacting said oxidized rubber composition with a sulfur-containing acid further comprises contacting with a second aqueous medium.

8. A process according to claim 1 wherein said rubber is selected from the group consisting of butyl rubber, polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and combinations thereof.

9. A process according to claim 1 wherein said rubber is butyl rubber.

10. A process according to claim 1 wherein said oxidizing agent is selected from the group consisting of peroxides, chlorates, perchlorates, nitrates, permanganates, oxygen under pressure, and combinations thereof.

11. A process according to claim 1 wherein said oxidizing agent is hydrogen peroxide.

12. A process according to claim 1 wherein the amount of said oxidizing agent is an amount which provides said oxidized rubber composition and further wherein said oxidizing agent-contacting condition comprises a temperature in the range of from about 70° F. to about 120° F., a pressure in the range of from about atmospheric to about 100 pounds per square inch absolute, and a time period in the range of from about 1 minute to about 60 minutes.

13. A process according to claim 1 wherein said sulfur-containing acid is selected from the group consisting of sulfuric acid, fuming sulfuric acid, chlorosulfonic acid, p-toluene sulfonic acid, methane sulfonic acid, and combinations thereof.

14. A process according to claim 1 wherein said sulfur-containing acid is sulfuric acid.

15. A process according to claim 1 wherein the amount of said sulfur-containing acid is an amount which provides said sulfonated, oxidized rubber composition and further wherein said acid-contacting condition comprises a temperature in the range of from about 110° F. to about 300° F., a pressure in the range of from about atmospheric to about 100 pounds per square inch absolute, and a time period in the range of from about 1 minute to about 60 minutes.

16. A process according to claim 2 wherein said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, and combinations thereof.

17. A process according to claim 2 wherein said base is sodium hydroxide.

18. A process according to claim 2 wherein the amount of said base is an amount which provides said neutralized, sulfonated, oxidized rubber composition and further wherein said base-contacting condition comprises a temperature in the range of from about 100° F. to about 200° F., a pressure in the range of from about atmospheric to about 100 pounds per square inch absolute, and a time period in the range of from about 1 minute to about 60 minutes.

19. A process according to claim 3 wherein said drying condition comprises a temperature in the range of from about 180° F. to about 280° F., a time period in the range of from about 0.1 hour to about 40 hours, and a pressure in the range of from about atmospheric to about 150 pounds per square inch absolute.

20. A composition prepared by the process of claim 1.
21. A composition prepared by the process of claim 2.
22. A composition prepared by the process of claim 3.
23. A composition prepared by the process of claim 4.
24. A composition prepared by the process of claim 5.
25. A composition prepared by the process of claim 6.
26. A composition prepared by the process of claim 7.
27. A composition prepared by the process of claim 8.
28. A composition prepared by the process of claim 9.
29. A composition prepared by the process of claim 10.
30. A composition prepared by the process of claim 11.
31. A composition prepared by the process of claim 12.
32. A composition prepared by the process of claim 13.
33. A composition prepared by the process of claim 14.
34. A composition prepared by the process of claim 15.
35. A composition prepared by the process of claim 16.
36. A composition prepared by the process of claim 17.
37. A composition prepared by the process of claim 18.
38. A composition prepared by the process of claim 19.

39. A composition comprising a neutralized, sulfonated, oxidized rubber composition.

40. A composition according to claim 39 wherein said rubber is selected from the group consisting of butyl rubber, polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and combinations thereof.

41. A composition according to claim 39 wherein said rubber is butyl rubber.

42. A composition according to claim 39 wherein said neutralized, sulfonated, oxidized rubber composition has a particle size in the range of from about 150 micrometers to about 2000 micrometers.

43. A composition according to claim 39 wherein said composition further comprises an aqueous medium.

44. A composition according to claim 43 wherein said composition further comprises a component selected from the group consisting of clays, polymers, other loss circulation additives, and combinations thereof.

45. A composition according to claim 44 wherein said clays are selected from the group consisting of montmorillonite, kaolinite, halloysite, vermiculite, attapulgite, smectite, illite, saconite, sepiolite, polygorskite, fuller's earth, chlorite, and combinations thereof.

46. A composition according to claim 44 wherein said polymers are selected from the group consisting of starches, gums, biopolysaccharides, cellulose, ethers, synthetics, and combinations thereof.

47. A composition according to claim 44 wherein said other loss circulation additives are selected from the group consisting of paper, cork, saw dust, wood shavings, rock, mica flakes, cloth, cements, silicates, and combinations thereof.

48. A process comprising contacting a composition comprising a neutralized, sulfonated, oxidized rubber composition with a subterranean formation.

49. A process according to claim 48 wherein said rubber is selected from the group consisting of butyl rubber, polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and combinations thereof.

50. A process according to claim 48 wherein said neutralized, sulfonated, oxidized rubber composition has a particle size in the range of from about 150 micrometers to about 2000 micrometers.

51. A process according to claim 48 wherein said composition further comprises an aqueous medium.

52. A process according to claim 51 wherein said composition further comprises a component selected from the group consisting of clays, polymers, other loss circulation additives, and combinations thereof.

53. A process according to claim 52 wherein said clays are selected from the group consisting of montmorillonite, kaolinite, halloysite, vermiculite, attapulgite, smectite, illite, saconite, sepiolite, polygorskite, fuller's earth, chlorite, and combinations thereof.

54. A process according to claim 52 wherein said polymers are selected from the group consisting of starches, gums, biopolysaccharides, cellulose, ethers, synthetics, and combinations thereof.

55. A process according to claim 52 wherein said other loss circulation additives are selected from the group consisting of paper, cork, saw dust, wood shavings, rock, mica flakes, cloth, cements, silicates, and combinations thereof.

56. A process according to claim 48 wherein said composition further comprises an aqueous medium and a clay.

57. A process according to claim 48 wherein said subterranean formation has a temperature in the range of from about 35° F. to about 600° F. and the temperature of said composition is in the range of from about 30° F. to about 150° F.

58. A process comprising:
subjecting butyl rubber to particle size reduction to provide a size-reduced butyl rubber having a particle size in the range of from about 150 micrometers to about 2000 micrometers,
cryogenically freezing said size-reduced butyl rubber,
contacting said size-reduced butyl rubber with an oxidizing agent under an oxidizing agent-contacting condition to provide an oxidized size-reduced butyl rubber,
contacting said oxidized size-reduced butyl rubber with a sulfur-containing acid under an acid-contacting condition to provide a sulfonated, oxidized, size-reduced butyl rubber, and contacting said sulfonated, oxidized, size-reduced butyl rubber with a base under a base-contacting condition to provide a neutralized, sulfonated, oxidized size-reduced butyl rubber.

59. A process according to claim 58 further comprising drying said neutralized, sulfonated, oxidized size-reduced butyl rubber under a drying condition to provide a dried, neutralized, sulfonated, oxidized size-reduced butyl rubber.

60. A process according to claim 58 wherein said oxidizing agent is selected from the group consisting of peroxides, chlorates, perchlorates, nitrates, permanganates, oxygen under pressure, and combinations thereof; said sulfur-containing acid is selected from the group consisting of sulfuric acid, fuming sulfuric acid, chlorosulfonic acid, p-toluene sulfonic acid, methane sulfonic acid, and combinations thereof; and said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, and combinations thereof.

61. A process according to claim 58 wherein said oxidizing agent is hydrogen peroxide, said sulfur-containing acid is sulfuric acid, and said base is sodium hydroxide.

62. A process according to claim 59 further comprising contacting said dried, neutralized, sulfonated, oxidized size-reduced butyl rubber with an aqueous medium and a clay.

63. A process according to claim 62 further comprising contacting said composition with a subterranean formation.

64. A composition comprising a sulfonated, oxidized rubber composition.

65. A composition according to claim 64 wherein said rubber is selected from the group consisting of butyl rubber, polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and combinations thereof.

66. A composition according to claim 65 wherein said rubber is butyl rubber.

67. A composition according to claim 66 wherein said sulfonated, oxidized rubber composition has a particle size in the range of from about 150 micrometers to about 2000 micrometers.

68. A composition according to claim 64 wherein said composition further comprises a sulfur-containing acid and a first aqueous medium.

69. A composition according to claim 68 wherein said sulfur-containing acid is selected from the group consisting of sulfuric acid, fuming sulfuric acid, chlorosulfonic acid, p-toluene sulfonic acid, methane sulfonic acid, and combinations thereof.

70. A process comprising contacting a composition comprising a sulfonated, oxidized rubber composition with asphalt.

71. A process according to claim 70 wherein said rubber is selected from the group consisting of butyl rubber, polychloroprene, sodium rubber, acrylonitrilebutadiene copolymers, butadiene-styrene copolymers, ethylenepropylene-diene rubber, polyisoprene, polyacrylonitrile, silicone, epichlorohydrin, polyurethane, and combinations thereof.

72. A process according to claim 71 wherein said rubber is butyl rubber.

73. A process according to claim 72 wherein said sulfonated, oxidized rubber composition has a particle size in the range of from about 150 micrometers to about 2000 micrometers.

74. A process according to claim 70 wherein said composition further comprises a sulfur-containing acid and a first aqueous medium.

75. A process according to claim 74 wherein said sulfur-containing acid is selected from the group consisting of sulfuric acid, fuming sulfuric acid, chlorosulfonic acid, p-toluene sulfonic acid, methane sulfonic acid, and combinations thereof.

* * * * *